United States Patent
Li et al.

(10) Patent No.: US 11,137,619 B2
(45) Date of Patent: Oct. 5, 2021

(54) DISPLAY DEVICE FOR VIRTUAL REALITY, VIEWING DEVICE FOR VIRTUAL REALITY AND HEAD-MOUNTED DISPLAY APPARATUS

(71) Applicants: Beijing BOE Optoelectronics Technology Co., Ltd., Beijing (CN); BOE Technology Group Co., Ltd., Beijing (CN)

(72) Inventors: Wenyu Li, Beijing (CN); Yukun Sun, Beijing (CN); Yali Liu, Beijing (CN); Hao Zhang, Beijing (CN); Lili Chen, Beijing (CN); Jinghua Miao, Beijing (CN); Xuefeng Wang, Beijing (CN); Xi Li, Beijing (CN); Bin Zhao, Beijing (CN); Lixin Wang, Beijing (CN); Jianwen Suo, Beijing (CN); Qingwen Fan, Beijing (CN); Jinbao Peng, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/643,145

(22) PCT Filed: May 28, 2019

(86) PCT No.: PCT/CN2019/088830
§ 371 (c)(1),
(2) Date: Feb. 28, 2020

(87) PCT Pub. No.: WO2019/228352
PCT Pub. Date: Dec. 5, 2019

(65) Prior Publication Data
US 2020/0348533 A1 Nov. 5, 2020

(30) Foreign Application Priority Data

May 31, 2018 (CN) .......................... 201810547964.6

(51) Int. Cl.
*G02B 30/25* (2020.01)
*G02B 3/08* (2006.01)
*G02F 1/1335* (2006.01)

(52) U.S. Cl.
CPC .............. *G02B 30/25* (2020.01); *G02B 3/08* (2013.01); *G02F 1/133528* (2013.01); *G02F 1/133538* (2021.01)

(58) Field of Classification Search
None
See application file for complete search history.

(56) References Cited

U.S. PATENT DOCUMENTS 6,353,508 B1 * 3/2002 Burke ................... G02B 30/25
359/742
2005/0168815 A1 * 8/2005 Maruyama ............. G02B 30/27
359/465

(Continued)

FOREIGN PATENT DOCUMENTS

CN 1648717 A 8/2005
CN 102109677 A 6/2011

(Continued)

OTHER PUBLICATIONS

First Office Action, including Search Report, for Chinese Patent Application No. 201810547964.6, dated Aug. 26, 2019, 22 pages.

*Primary Examiner* — Edward J Glick
*Assistant Examiner* — David Y Chung
(74) *Attorney, Agent, or Firm* — Westman, Champlin & Koehler, P.A.

(57) ABSTRACT

A display device for virtual reality, a viewing device for virtual reality and a head-mounted display apparatus are (Continued)

provided. The display apparatus includes: a display panel; a first polarizer which is disposed on a first surface of the display panel and includes a plurality of first regions and a plurality of second regions, the plurality of first regions and the plurality of second regions being alternately distributed in a first direction, wherein a polarization direction of each of the plurality of first regions is perpendicular to a polarization direction of each of the plurality of second regions.

12 Claims, 6 Drawing Sheets

(56) References Cited

U.S. PATENT DOCUMENTS

| | | | |
|---|---|---|---|
| 2009/0195873 A1 | 8/2009 | Kubara | |
| 2016/0033782 A1* | 2/2016 | Wang | G02B 30/25 |
| | | | 349/61 |
| 2020/0159037 A1 | 5/2020 | Li et al. | |

FOREIGN PATENT DOCUMENTS

| | | |
|---|---|---|
| CN | 103852896 A | 6/2014 |
| CN | 205540574 U | 8/2016 |
| CN | 205608305 U | 9/2016 |
| CN | 205665452 U | 10/2016 |
| CN | 206991015 U | 2/2018 |
| CN | 108445633 A | 8/2018 |
| CN | 108732763 A | 11/2018 |
| GB | 2516242 A | 1/2015 |

* cited by examiner

DISPLAY DEVICE FOR VIRTUAL REALITY, VIEWING DEVICE FOR VIRTUAL REALITY AND HEAD-MOUNTED DISPLAY APPARATUS

CROSS-REFERENCE TO RELATED APPLICATION

The present application is a Section 371 National Stage Application of International Application No. PCT/CN2019/088830, filed on May 28, 2019, entitled "Display Device for Virtual Reality, Viewing Device for Virtual Reality and Head-Mounted Display Apparatus", which claims the benefit of Chinese Patent Application No. 201810547964.6 filed on May 31, 2018 in the National Intellectual Property Administration of China, the disclosures of which are incorporated herein by reference.

TECHNICAL FIELD

The present disclosure relates to a field of virtual reality technology, and in particular, to a display device for virtual reality, a viewing device for virtual reality and a head-mounted display apparatus (abbreviated as "head display").

BACKGROUND

Virtual reality (VR) head-mounted display apparatuses usually take a form of dual display devices (a left-eye display device and a right-eye display device) and dual lenses (a left-eye lens and a right-eye lens), that is, each of the left and right eyes of a person respectively correspond to one display device and one lens. An observer can see images on the respective display devices through two eyes to obtain a stereoscopic vision. This head-mounted display apparatus is provided with a light blocking plate, which is arranged between two lenses and between two display devices and whose function is to connect and fix the two lenses and to prevent the left eye from seeing the right display device and the right eye from seeing the left display device, thereby avoiding binocular vision disorder.

SUMMARY

According to a display device for virtual reality, including: a display panel; a first polarizer which is disposed on a first surface of the display panel and includes a plurality of first regions and a plurality of second regions, the plurality of first regions and the plurality of second regions being alternately distributed in a first direction, wherein a polarization direction of each of the plurality of first regions is perpendicular to a polarization direction of each of the plurality of second regions.

In some embodiments, the first surface is a light emitting surface of the display panel.

In some embodiments, the plurality of first regions and the plurality of second regions are configured as a plurality of strip-shaped regions extending in a second direction, wherein the first direction and the second direction intersect each other.

In some embodiments, the display panel includes a plurality of sub-pixels arranged in an array, a row direction of the array is the first direction and a column direction of the array is the second direction, an orthographic projection of each of the plurality of first regions and the plurality of second regions on the display panel covers 1 to 3 columns of the sub-pixels.

In some embodiments, the display device further includes a second polarizer disposed on a side of the display panel distal to the first polarizer, and the second polarizer includes a plurality of third regions and a plurality of fourth regions, the plurality of third regions and the plurality of fourth regions being alternately distributed in the first direction; orthographic projections of the plurality of third regions on the display panel overlap with orthographic projections of the plurality of first regions on the display panel respectively, and orthographic projections of the plurality of fourth regions on the display panel overlap with orthographic projections of the plurality of second regions on the display panel respectively; a polarization direction of each of the plurality of third regions is perpendicular to the polarization direction of each of the plurality of first regions, and a polarization direction of each of the plurality of fourth regions is perpendicular to the polarization direction of each of the plurality of second regions.

In some embodiments, the display panel includes a first substrate, a second substrate, and a liquid crystal layer between the first substrate and the second substrate.

An embodiment of the present disclosure also provides a viewing device for virtual reality, including: a lens; a third polarizer and a fourth polarizer which are arranged side by side on a second surface of the lens, and wherein a polarization direction of the third polarizer being perpendicular to a polarization direction of the fourth polarizer.

In some embodiments, the viewing device does not include a liquid crystal layer.

In some embodiments, the third polarizer and the fourth polarizer are in contact with each other.

In some embodiments, a combination of an orthographic projection of the third polarizer on the second surface and an orthographic projection of the fourth polarizer on the second surface covers the second surface.

In some embodiments, the lens is a one-piece Fresnel lens, and the third polarizer and the fourth polarizer are disposed on a flat surface of the Fresnel lens.

In some embodiments, the one-piece Fresnel lens includes a first sub-Fresnel lens pattern and a second sub-Fresnel lens pattern arranged side by side on a side opposite to the flat surface.

An embodiment of the present disclosure also provides a head-mounted display apparatus, including: the display device as described in any one of the above embodiments; the viewing device as described in any one of the above embodiments; wherein the polarization direction of each of the plurality of first regions of the first polarizer in the display device is the same as the polarization direction of the third polarizer in the viewing device, and the polarization direction of each of the plurality of second regions of the first polarizer in the display device is the same as the polarization direction of the fourth polarizer in the viewing device.

In some embodiments, the third polarizer and the fourth polarizer are located on a side of the lens in the viewing device distal to the display device.

BRIEF DESCRIPTION OF THE DRAWINGS

FIGS. 7A and 7B schematically show structures of a Fresnel lens in some embodiments of the present disclosure, where

DETAILED DESCRIPTION OF EMBODIMENTS

Embodiments of the present disclosure will be described in detail below. The embodiments described below are exemplary and are only used to explain the present disclosure, and should not be construed as limiting the present disclosure. If the specific technology or conditions are not explained in the examples, these technology or conditions known in the art should be followed.

Figure 1:
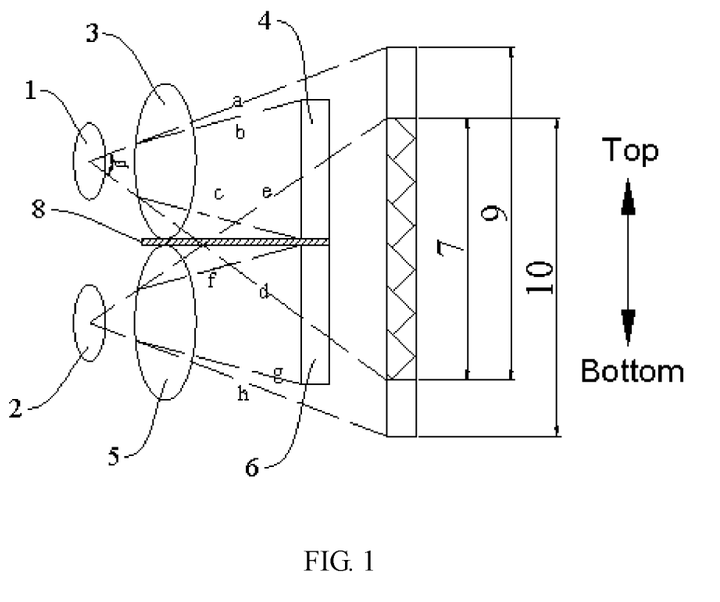
FIG. 1 schematically shows a structure of a virtual reality head-mounted display apparatus in the related art.

Referring to FIG. 1, in the related art, a virtual reality (VR) head-mounted display apparatus generally takes a form of a dual display device (a left-eye display device 4 and a right-eye display device 6) and a dual lens (a left-eye lens 3 and a right-eye lens 5), that is, the left eye 1 of a person corresponds to one display device and one lens while the right eye 2 of a person corresponds to the other display device and the other lens. An observer can see images on the respective display devices through two eyes to obtain a stereoscopic vision, where the image 9 seen by the left eye and the image 10 seen by the right eye are superimposed to obtain an overlapped image 7 seen by both eyes. However, this head-mounted display apparatus has an important structure, that is, a light blocking plate 8 (lens barrel structure), which is arranged between two lenses and between two display devices and has functions of connecting and fixing the two lenses and preventing the left eye from seeing the right display device and preventing the right eye from seeing the left display device, thereby avoiding binocular vision disorder.

It should be noted that the meaning of the eight dashed lines a-h in FIG. 1 is provided as follows: line a represents a connection line between the image formed by the top of the left-eye display device 4 and the left eye 1, line b represents an actual light which is refracted from the top of the left-eye display device 4 and transmitted to the left eye through the left-eye lens 3, line c represents an actual light which is refracted from the bottom of the left-eye display device 4 and transmitted to the left eye through the left-eye lens 3, and line d represents a connection line between the image formed by the bottom of the left-eye display device 4 and the left eye 1; line e represents a connection line between the image formed by the top of the right-eye display device 6 and the right eye 2, line f represents an actual light which is refracted from the top of the right-eye display device 6 to the right eye 2 through the right-eye lens 5, and line g represents an actual light which is refracted from the bottom of the right-eye display device 6 and transmitted to the right eye 2 through the right-eye lens 5, line h represents a connection line between the image formed by the bottom of the right-eye display device 6 and the right eye 2. The field-of-view angle β (field-of-view of a single eye) of such a head-mounted display apparatus is limited by the light blocking plate 8 and is difficult to be increased, on the other hand, the two display devices must be strictly aligned when being installed and fixed, and they should not be angled to each other at all, thus, high structural design accuracy is required, which may reduce the yield during mass production. In addition, the light blocking plate 8 between the two display devices will increase the structural complexity and weight burden of the device.

The present disclosure aims to solve at least one of the technical problems in the related art. Embodiments of the present disclosure provide a display device for virtual reality. According to an embodiment of the present disclosure, referring to FIG. 2, the display device includes: a display panel 100; a first polarizer 110. The first polarizer 110 is disposed on a first surface 101 of the display panel 100, and the first polarizer 110 includes a plurality of first regions 111 and a plurality of second regions 112. The plurality of first regions 111 and the plurality of second regions 112 are alternately distributed in a first direction. The polarization direction of each first region 111 and that of each second region 112 are perpendicular to each other. Therefore, the lights emitted from the first regions 111 and the second regions 112 are two kinds of lights whose polarization directions are perpendicular to each other, so that only one display panel may be used to simultaneously provide display images for both eyes of the user, for example, by matching polarizers with suitable polarization directions, such that one eye of the user may only see the display image of the first regions, and the other eye may only see the display image of the second regions, or two images can be output from one same frame in the display panel, that is, the plurality of the first regions output one image correspondingly, and the plurality of the second regions output the other image correspondingly. These two images enter the two eyes of the user respectively, and then an overall picture is synthesized by the brain, so that the user has a three-dimensional visual sense. At the same time, compared with the prior art, using one display device may eliminate the limitation to a strict alignment relationship during the installation of dual display devices, improve production yield, and in addition, both eyes of the user can see the entire display device, which may greatly increase the field-of-view angle and binocular overlapping area of the head-mounted display apparatus, thereby enhancing the user's virtual world immersion sense.

Figure 2:
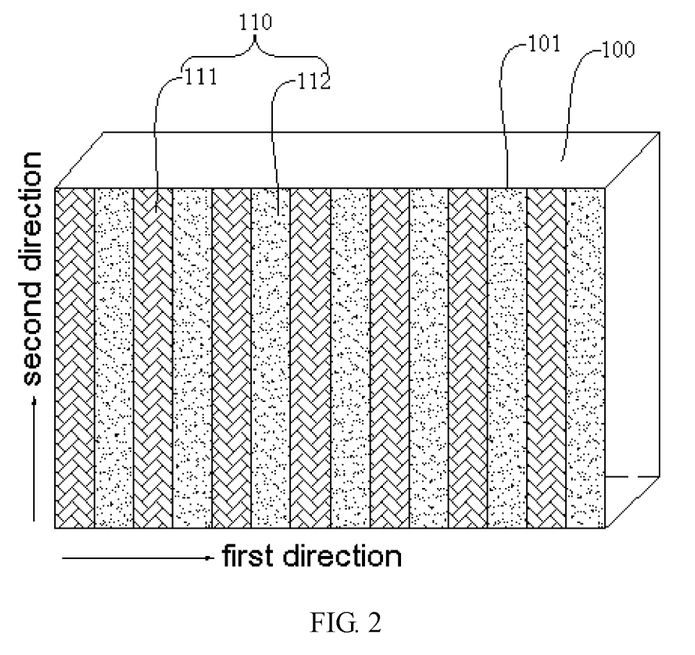
FIG. 2 schematically shows a structure of a three-dimensional structure of a display device for virtual reality in some embodiments of the present disclosure.

According to an embodiment of the present disclosure, referring to FIG. 2, in order to enhance user's experience, the plurality of the first regions 111 and the plurality of the second regions 112 respectively present strip-shaped regions extending in a second direction, the second direction intersects with the first direction. Therefore, the first regions and the second regions may output polarized lights having polarization directions perpendicular to each other, so that the display panel outputs two images corresponding to two eyes, and the first polarizer may be divided into more first regions and second regions to display the image more clearly and enhance the user's experience. In case that the display device is used in a virtual reality head-mounted display apparatus, the stereoscopic vision of the screen may also be enhanced.

It should be noted that the first direction refers to the long side direction (or the short side direction) of the display device, and the second direction refers to the short side direction (or the long side direction) of the display device. In some embodiments, the first surface refers to a light emitting surface of the display panel, that is, a surface closer to a user when the display panel is actually used.

Figure 3A:
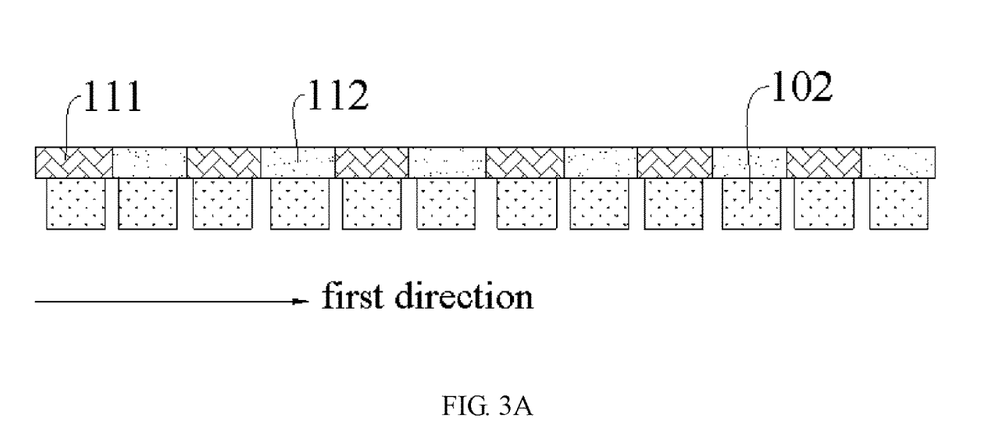
FIGS. 3A and 3B are views illustrating a position correspondence relationship between a first polarizer and a sub-pixel in some embodiments of the present disclosure.
Figure 3B:
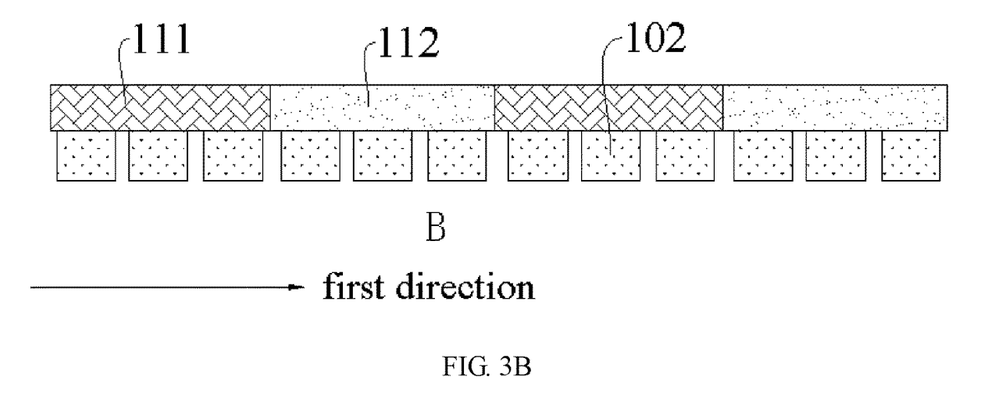

According to an embodiment of the present disclosure, in order to improve the quality of an image displayed by a display device, and to enhance the stereoscopic vision of the image when the display device is used in a virtual reality head-mounted display apparatus. Referring to FIG. 3A and FIG. 3B (in the figure, in order to facilitate the description of the positional relationship between the first regions and the sub-pixels and between the second regions and the sub-pixels, other structures in the display panel are omitted), the sub-pixels 102 in the display panel are arranged in an array, and the row direction of the array is the first direction, the column direction of the array is the second direction, or in other words, the sub-pixels 102 in the display panel are distributed in rows in the first direction and in columns in the second direction. In some embodiments, the orthographic projection of each of the plurality of first regions 111 and the plurality of second regions 112 on the display panel 100 covers 1 to 3 columns of the sub-pixels 102, which may prevent the problem that the adjacent sub-pixels correspondingly covered by the first region and the second region adjacent to each other are unevenly spaced from being perceived by the human eyes and thereby adversely affecting the experience. Specifically, FIG. 3B shows that the orthographic projection of each of the first regions 111 and the second regions 112 on the display panel 100 cover three columns of the sub-pixels 102 respectively. Therefore, the actual image quality of the display device is better. In case that the display device is used in a virtual reality head-mounted display apparatus, it can also enhance the stereoscopic vision of the image and improve the immersion feeling of the user in virtual world. FIG. 3A shows the orthographic projection of each of the first regions 111 and the second regions 112 on the display panel 100 respectively covers one column of the sub-pixels 102. In this way, the actual image quality of the display device can be further improved. When the display device is used in a virtual reality head-mounted display apparatus, it can further enhance the stereoscopic vision of the image and improve the immersion feeling of the user in virtual world. Embodiments of the present disclosure are not limited thereto. For example, the orthographic projection of each of the first regions 111 and the second regions 112 on the display panel 100 respectively covers more than three columns of sub-pixels 102.

According to the embodiment of the present disclosure, in one same display device, the number of sub-pixel columns covered by the plurality of the first regions 111 may be same to or different from the number of sub-pixel columns covered by the plurality of the second regions 112. For example, in some embodiments of the present disclosure, the orthographic projection of each of the first regions 111 and the second regions 112 on the display panel 100 respectively covers 1 to 3 columns of the sub-pixels 102 and the number of columns of the sub-pixels 102 covered by the orthographic projection of each of the first regions 111 is same to the number of columns of the sub-pixels 102 covered by the orthographic projection of each of the second regions 112; in other embodiments of the present disclosure, the orthographic projections of each of the first regions 111 and the second regions 112 on the display panel 100 respectively covers 1 to 3 columns and the number of columns of the sub-pixels 102 covered by the orthographic projection of each of the first regions 111 is different from the number of columns of the sub-pixels 102 covered by the orthographic projection of each of the second regions 112; in still other embodiments of the present disclosure, the orthographic projections of the different first regions 111 (or the second regions) on the display panel 100 cover 1 to 3 columns of the sub-pixels 102. In some embodiments of the present disclosure, the orthographic projection of each of the first regions 111 and the second regions 112 on the display panel 100 respectively covers 1 to 3 columns and the number of columns of the sub-pixels 102 covered by the orthographic projection of each of the first regions 111 is same to the number of columns of the sub-pixels 102 covered by the orthographic projection of each of the second regions 112. Thus the image display effect is best, three-dimensional effect of the image is strongest, and viewing effect is best. According to the embodiments of the present disclosure, there are no restrictions on the specific types of the sub-pixels, and those skilled in the art can set flexibly according to actual needs. In some embodiments of the present disclosure, the sub-pixels may be red, green, and blue sub-pixels; in other embodiments of the present disclosure, the sub-pixels may be red, green, blue and white sub-pixels; in still other embodiments of the present disclosure, the sub-pixels may be red, green, blue, white, and yellow sub-pixels. Thereby, the selection range of a display panel can be broadened.

Figure 4:
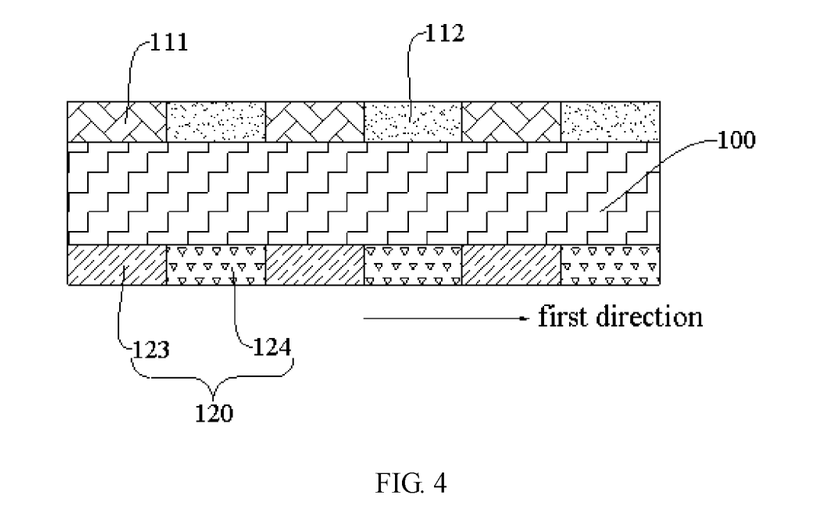
FIG. 4 schematically shows a structure of a display device in some embodiments of the present disclosure, in a cross-sectional view.
Figure 5:
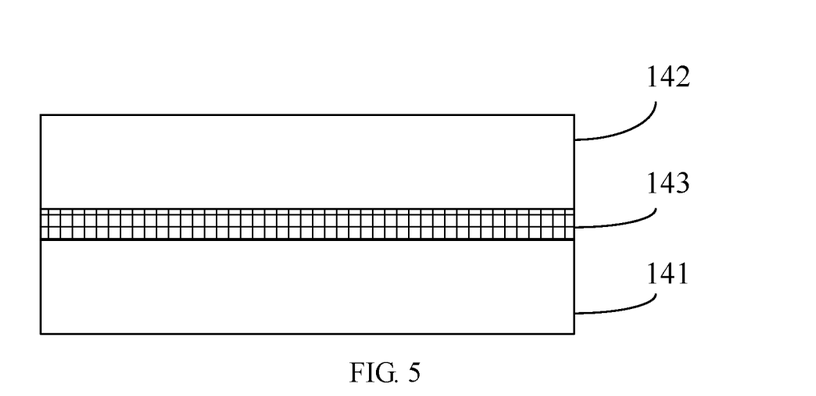
FIG. 5 schematically illustrates a display panel of a display device in some embodiments of the present disclosure.

According to an embodiment of the present disclosure, the display panel may be an OLED display panel or a liquid crystal display panel. For example, as shown in FIG. 5, the display panel may include a first substrate (e.g., an array substrate) 141 and a second substrate (e.g., a color filter substrate) 142 and a liquid crystal layer 143 between the first substrate 141 and the second substrate 142. When the display panel is a liquid crystal display panel, it is well known for those skilled in the art that the LCD display panel has an upper polarizer and a lower polarizer. In order to simplify the manufacturing process and the structure of the display device under the premise of ensuring normal use, the present application uses the above-mentioned first polarizer as an upper polarizer of a display device. Referring to FIG. 4, the display device further includes a second polarizer 120, and the second polarizer 120 is disposed on a side of the display panel 100 distal to the first polarizer, and the second polarizer 120 has third regions 123 and fourth regions 124, and the projections of the third regions 123 on the display panel 100 overlaps with the orthographic projections of the first regions 111 on the display panel 100 and the projections of the fourth regions 124 on the display panel 100 overlaps with the orthographic projections of the second regions 112 on the display panel 100, and the polarization direction of each of the third regions 123 is perpendicular to the polarization direction of each of the first regions 111 and the polarization direction of each of the fourth regions 124 is perpendicular to the polarization direction of each of the second regions 112. Therefore, the first polarizer constitutes the upper polarizer of the display device, and the second polarizer constitutes the lower polarizer of the display device, which can not only meet the display requirements of the display device, but also meet the aforementioned use requirements of the display device when being used in virtual reality, while simplifying the structure and manufacturing process of the display device and reducing costs.

Those skilled in the art will understand that, in addition to the aforementioned sub-pixels, the display panel also includes structures or components necessary for a conventional display panel, such as thin film transistors, electrodes, light-shielding layers, insulating layers, black matrix, and base substrate. In addition to the display panel, the first polarizer, and the second polarizer described above, the display device may include structures or components necessary for a conventional display device, such as a cover plate and a middle frame.

Figure 6:
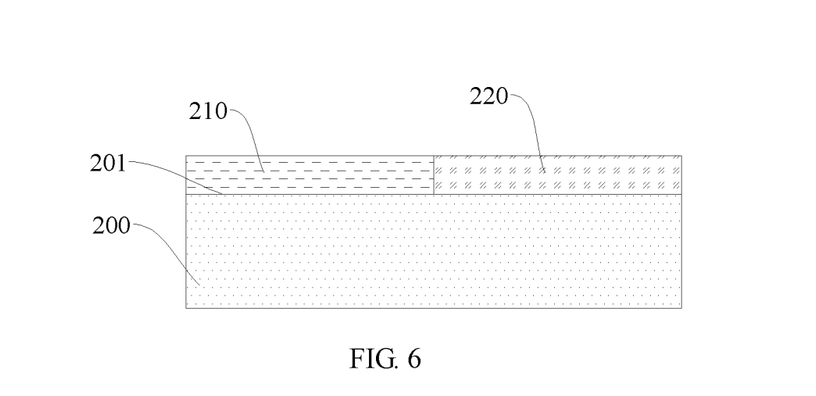
FIG. 6 schematically shows a structure of a viewing device for virtual reality in some embodiments of the present disclosure, in a cross-sectional view.

Embodiments of the present disclosure also provide a viewing device for virtual reality. According to an embodiment of the present disclosure, referring to FIG. 6, the viewing device includes: a lens 200; a third polarizer 210 and a fourth polarizer 220. The third polarizer 210 and the fourth polarizer 220 are arranged side by side on the second surface 201 of the lens 200, the polarization direction of the third polarizer 210 and the polarization direction of the fourth polarizer 220 are perpendicular to each other. In this way, the viewing device may not include a liquid crystal layer. As a result, the viewing device has a simple and lightweight structure, and no liquid crystal layer is provided, which can not only realize a virtual effect of virtual reality, but also simplify the viewing device; in cooperation with the display device described above, the two kinds of light, i.e., the light emitted from each of the first regions and the light emitted from each of the second regions that have polarization directions perpendicular to each other pass through the third polarizer and the fourth polarizer, so that the two kinds of mutually perpendicular and polarized light are incident into the eyes of the user, respectively, that is, the two images output from one same frame picture in the display device enter the user's two eyes, respectively, which prevents the user from seeing two images with the same eye. After that, the two images are synthesized into the overall picture through the brain, so that the user has a three-dimensional visual sense. In addition, compared with a virtual reality display device using two lenses, the viewing device for virtual reality of the present application only needs to use one lens to enlarge the image of the display device, which has only one imaging surface, and does not need to consider the limitation of strict alignment relationship of the two-lens structure, thereby avoiding the problem that the two lens imaging surfaces of the dual lens may not be on a same surface (There are two reasons why the two lens imaging surfaces are not on one plane: a. the optical parameters of the two lenses are not completely consistent, i.e. there may be defects; b. the fixing structure of the two lenses are not aligned with each other. These two reasons are likely to cause the product yield decreases during production), while simplifying the fixing structure of the lens and facilitating installation, which is especially suitable for mass production and has a high yield.

According to the embodiment of the present disclosure, in order to enlarge the image to be viewed, a convex lens is used as the lens. Specifically, the convex lens may be any one of a biconvex lens, a plano-convex lens, and a concave-convex lens. At this time, the third polarizer and the fourth polarizer may be selectively arranged at any side of the lens. In some embodiments of the present disclosure, when the viewing device is applied to a virtual reality head-mounted display apparatus, in order to make two kinds of polarized light emitted from the third polarizer and the fourth polarizer incident to two eyes of the user, respectively, that is, to prevent a part of the polarized light emitted from the third polarizer from entering the other eye that does not correspond to the third polarizer, and to prevent a part of the polarized light emitted from the fourth polarizer from entering the other eye that does not correspond to the fourth polarizer, and further to avoid light mixing phenomenon and binocular vision disorder, the third polarizer and the fourth polarizer can be placed on the side of the lens close to the user's eyes, or the third polarizer and the fourth polarizer can be placed on the side of the lens distal to the display device for the virtual reality. In this way, the above-mentioned light mixing phenomenon can be better avoided, and binocular vision disorder can be prevented.

Figure 7A:
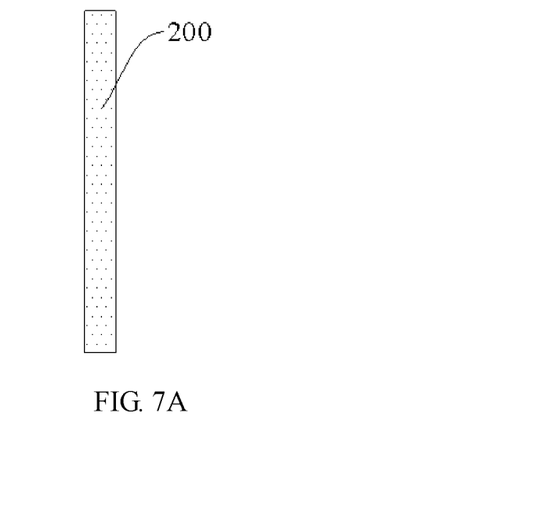
FIG. 7A is a side view of the Fresnel lens.
Figure 7B:
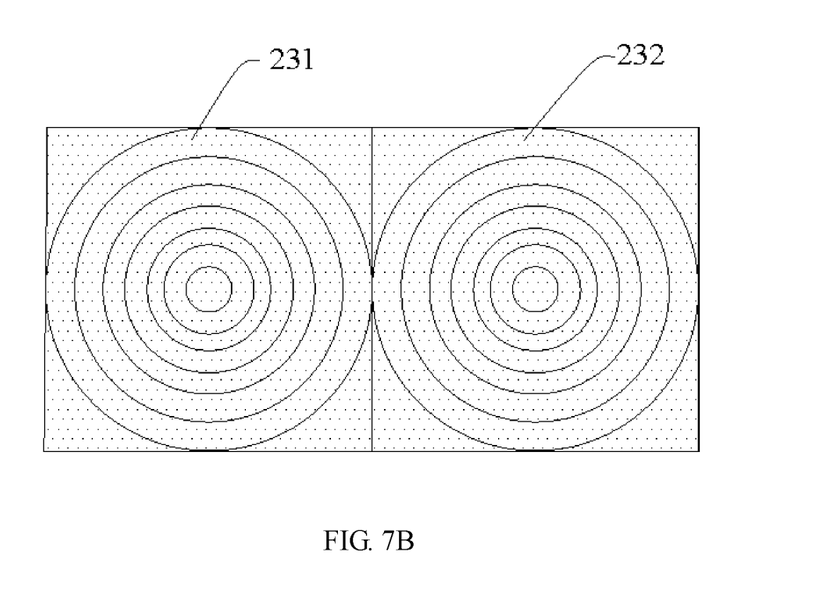
FIG. 7B is a front view of the Fresnel lens.
Figure 8:
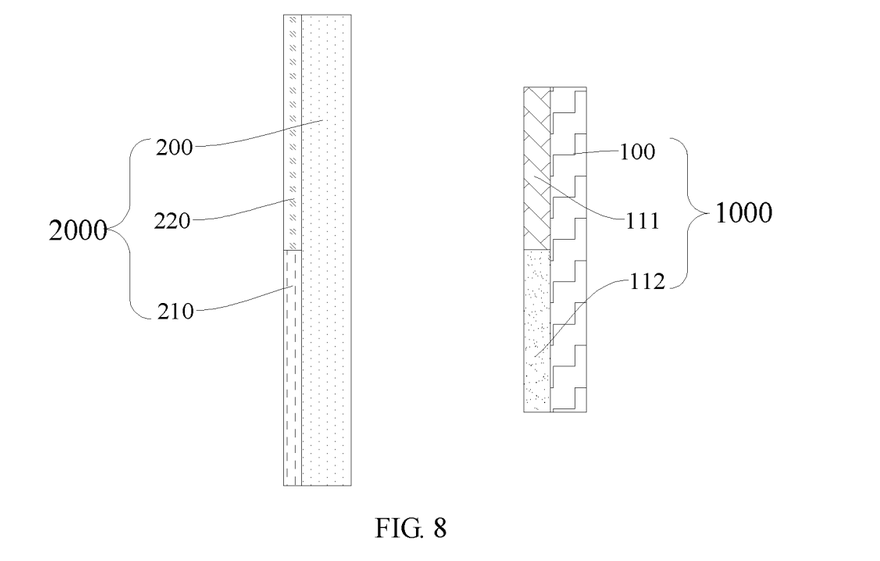
FIG. 8 schematically shows a structure of a head-mounted display apparatus in some embodiments of the present disclosure.

According to some embodiments of the present disclosure, in order to reduce the weight of a viewing device for virtual reality, the lens is a one-piece Fresnel lens, the schematic structural diagram of which may refer to FIGS. 7A and 7B, and the third polarizer and the fourth polarizer are disposed on the flat surface of the Fresnel lens. Thus, compared with other types of lenses, the Fresnel lens is thinner and lighter, which can reduce the weight of the viewing device. The other side of the Fresnel lens is non-planar (on which the small to large concentric circles are recorded), so the third polarizer and the fourth polarizer are set on the flat surface of the Fresnel lens to prevent the third polarizer and the fourth polarizer from falling off and thereby adversely affecting the quality of the viewing device. Further, when the viewing device is applied to a virtual reality head-mounted display apparatus, in order to avoid the above-mentioned light mixing phenomenon, the flat surface of a Fresnel lens may be set close to a user's eyes, or the flat surface of the Fresnel lens is provided on a side distal to the display device for virtual reality. In some embodiments, as shown in FIG. 7B, the one-piece Fresnel lens includes a first sub-Fresnel lens pattern 231 and a second sub-Fresnel lens pattern 232 arranged side by side on the side opposite to the flat surface. The first sub-Fresnel lens pattern 231 and the second sub-Fresnel lens pattern 232 may respectively correspond to two eyes of the user, which is beneficial to separately providing images for the two eyes of the user.

According to an embodiment of the present disclosure, in order to prevent the light mixing phenomenon, the third polarizer and the fourth polarizer are in contact with each other. In this way, there is no gap between the third polarizer and the fourth polarizer. Therefore, it can prevent a part of the light emitted from the display device from directly entering the eyes of the user through neither the third polarizer nor the fourth polarizer. When being used with a display device for virtual reality, it can prevent the user's eyes from seeing the two kinds of polarized light emitted from the display device, that is, to prevent the occurrence of light leakage. If the light leakage occurs, the eyes will be confused, which directly affects the three-dimensional effect of virtual reality.

According to the embodiment of the present disclosure, in order to better avoid the light leakage phenomenon described above, the combination of the orthographic projection of the third polarizer on the second surface and the orthographic projection of the fourth polarizer on the second surface covers the second surface. Therefore, the light emitted from the display device for virtual reality can only be incident in the eyes of the user through the third polarizer and the fourth polarizer, and it prevents a part of the light emitted from the display device for virtual reality from being directly incident into the user's eyes through the lens, and prevent the occurrence of light leakage, and prevent a binocular vision from being disordered, thereby enhancing the stereoscopic vision of the image.

Of course, those skilled in the art may understand that, in addition to the lens, the third polarizer, and the fourth polarizer described above, the viewing device for virtual reality also includes the necessary structures or components of a conventional viewing device for virtual reality, such as the main frame.

Figure 9:
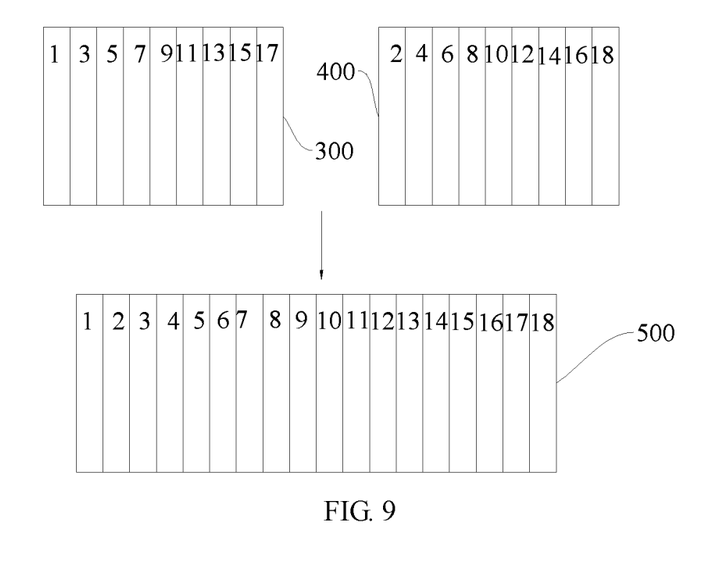
FIG. 9 schematically shows an output of a display image of a head-mounted display apparatus in some embodiments of the present disclosure.
Figure 10:
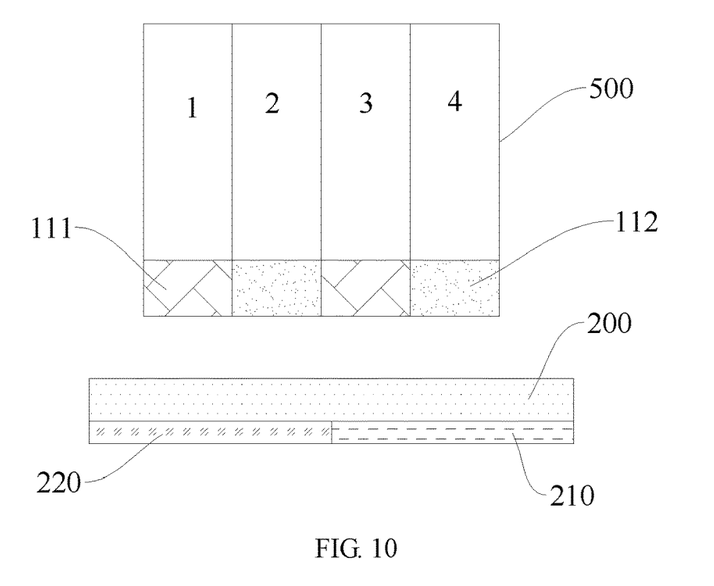
FIG. 10 schematically shows a structure of a head-mounted display apparatus in some embodiments of the present disclosure.

Embodiments of the present disclosure also provide a head-mounted display apparatus. According to an embodiment of the present disclosure, referring to FIGS. 8-11, the head-mounted display apparatus includes: the display device 1000 described above; and the viewing device 2000 described above, which may be used to view images displayed by the display device 1000. The polarization direction of each of the first regions 111 of the first polarizer in the display device 1000 is the same as that of the third polarizer 210 in the viewing device 2000, and the polarization direction of each of the second regions 112 of the first polarizer is the same as that of the fourth polarizer 220 in the viewing device 2000. Therefore, the lights emitted from the plurality of first regions and the plurality of second regions of the display device are the first polarized light and the second polarized light whose polarization directions are perpendicular to each other. Therefore, for one same frame of the display panel, the display device will output the first image 300 and the second image 400 whose polarization directions are perpendicular to each other. Specifically, the plurality of first regions output a plurality of stripe sub-images, and the plurality of stripe sub-images form the first image 300, that is, the plurality of first regions output a first image 300 that is incident finally and correspondingly to one eye of the user; the plurality of second regions output a plurality of stripe sub-images and the plurality of stripe sub-images form a second image 400, that is, the plurality of second regions correspondingly output the second image 400 that is incident finally and correspondingly to the other eye of the user; the two kinds of light emitted from the first regions and the second regions pass through the lens, and then respectively pass through the third polarizer and the fourth polarizer, and are then incident into the eyes of the user respectively, that is, the first image 300 and the second image 400 described above enter two eyes of the user respectively, and then the first image 300 and the second image 400 are synthesized into the overall picture 500 by the brain, that is, the plurality of strip sub-images in the first image 300 and the second image 400 alternate with each other to form the overall display image 500, that is, the picture displayed by the display device. Due to the above-mentioned output image method and enlargement by the lens, the user has a three-dimensional visual sense to the resulting picture 3000 seen by the user. Refer to FIG. 9 and FIG. 10 for a schematic diagram of displaying image output (the symbols 1-18 in the figure are pictures showing a plurality of sub-images, not reference numbers). The third polarizer and the fourth polarizer are arranged so that lights from the first region and the second region can be incident into two eyes of the user respectively, that is, the arrangement prevents a part of the light emitted from each one of the first regions and the second regions from being incident to the eye that does not correspond to the one of the first regions and the second regions, so as to avoid the phenomenon of light mixing and light leakage, and thus to prevent a vision disorder of the eyes.

Figure 11:
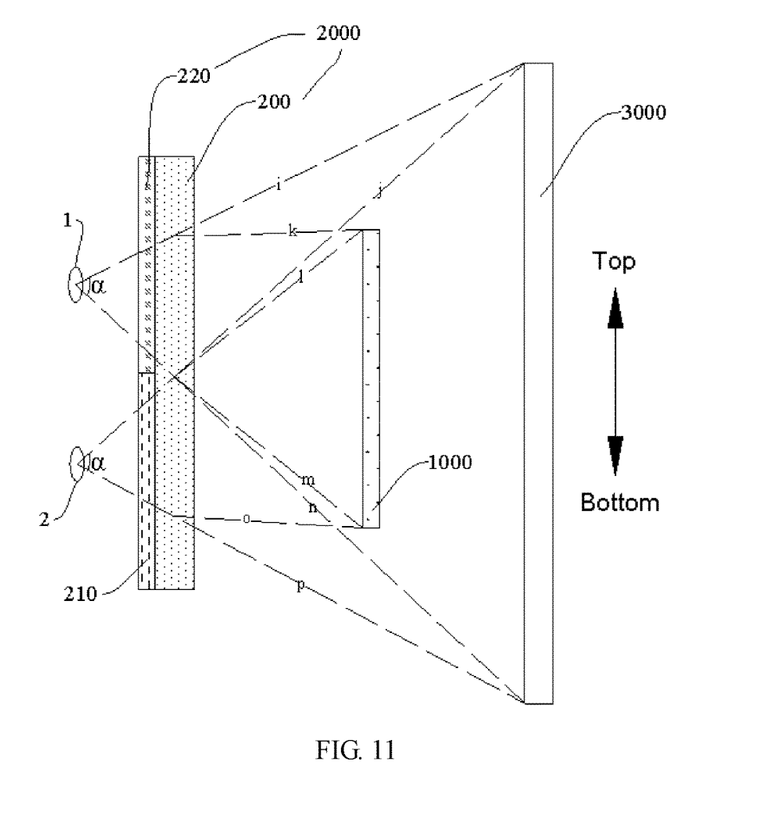
FIG. 11 schematically shows a structure of a head-mounted display apparatus in some embodiments of the present disclosure.

It should be noted that the meaning of the eight dashed lines i-p in FIG. 11 is: line i is the connection line between the image formed by the top of the display device 1000 and the left eye 1, line j is the connection line between the image formed by the top of the display device 1000 and the right eye 2, line k is the actual light which is refracted from the top of the display device 1000 and transmitted to the left eye 1 through the lens 200, line l is the actual light which is refracted from the top of the display device 1000 and transmitted to the right eye 2 through the lens 200, and line m is the actual light which is refracted from the bottom of the display device 1000 and transmitted to the left eye 1 through the lens 200, line o is the actual light which is refracted from the bottom of the display device 1000 and transmitted to the right eye 2 through the lens 200, line n is the connection line between the image formed by the bottom of the display device 1000 and the left eye 1, and line p is the connection line between the image formed by the bottom of the display device 1000 and the right eye 2. The angle α between the line i and the line n is the field-of-view angle of the left eye, and the angle α between the line j and the line p is the field-of-view angle of the right eye, that is, the field-of-view angle of the head-mounted display apparatus is α.

According to an embodiment of the present disclosure, the head-mounted display apparatus may have one or more of the following beneficial effects compared to the related art:

1. The embodiment of the present disclosure uses a single lens to magnify the image of the display device, and does not need to consider the strict alignment relationship of the dual lens structure, avoids the problem of dual-lens that the two lens imaging surfaces are not on one plane, and simplifying the fixing structure of the lens and facilitating installation, which is especially suitable for mass production and has a high yield;

2. The embodiment of the present disclosure uses a single lens and a single display device. It is hoped that the user's eyes can see the entire display device, that is, the left eye can see the rightmost end of the entire display device, and the right eye can see the leftmost end of the entire display device, which greatly improves the field of view α (refer to FIG. 11) of the VR head-mounted display apparatus and the binocular overlap region (the display region of the final screen 3000), thereby greatly enhancing the immersive feeling of the user to the virtual world;

3. The combination of single lens and single screen eliminates the need for the lens barrel structure in the middle of the double lens, which greatly simplifies the structure, reduces the weight of VR head-mounted display apparatus, and eliminates strict alignment constraints to the installation process of dual display devices.

According to the embodiments of the present disclosure, those skilled in the art may choose to set the third polarizer and the fourth polarizer on one surface of the lens according to actual needs. In some embodiments of the present disclosure, in order to make the light from the first region and the second region pass through the third polarizer and the fourth polarizer, and enter the two eyes of the user respectively, that is, prevent a part of the light emitted from each one of the third polarizer and the fourth polarizer from being incident into the eye that does not correspond to the one of the third polarizer and the fourth polarizer, so as to avoid light mixing and binocular vision disorder. Therefore, the third polarizer and the fourth polarizer are as close to the user's eyes as possible. In some embodiments of the present disclosure, in order to simplify the structure of the head-mounted display apparatus and make it lighter, the third polarizer and the fourth polarizer may be located on a side of the lens in the viewing device distal to the display device, refer to FIGS. 8 and 11. In this way, the light mixing phenomenon can be prevented, and the structure of the head-mounted display apparatus can be simplified to make it lighter.

The display device, the viewing device, and the VR head-mounted display apparatus according to the embodiments of the present disclosure have the advantages of simple structure, light weight, high mass production yield, a large field-of-view angle, or better experience.

In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present disclosure, the meaning of "a plurality" is two or more, unless specifically defined otherwise.

In this disclosure, unless explicitly stated and defined otherwise, the first feature "upper" or "lower" of the second feature may be the first and second features in direct contact, or the first and second features contact indirectly through an intermediate medium. Moreover, the first feature is "above" the second feature. It means that the first feature may be directly above or obliquely above the second feature, or only indicates that the first feature is higher in level than the second feature. The first feature is "below" the second feature. It means that the first feature may be directly below or obliquely below the second feature, or it may simply indicate that the first feature is lower in level than the second feature.

In the description of this specification, the description with reference to the terms "one embodiment", "some embodiments", "examples", "specific examples", or "some examples" and the like means specific features, structure, material or characteristic described in conjunction with the embodiments or examples is included in at least one embodiment or example of the present disclosure. In this specification, the schematic expressions of the above terms are not necessarily directed to the same embodiment or example. Moreover, the particular features, structures, materials, or characteristics described may be combined in any suitable manner in any one or more embodiments or examples. In addition, without any contradiction, those skilled in the art may join and combine different embodiments or examples and features of the different embodiments or examples described in this specification.

Although the embodiments of the present disclosure have been shown and described above, it can be understood that the above embodiments are exemplary and should not be construed as limitations on the present disclosure. Those skilled in the art can understand the above embodiments may be subject to change, modification, substitution, and modification within the scope of the present disclosure.

What is claimed is:

1. A head-mounted display apparatus, comprising:
a display device for virtual reality, the display device comprising: a display panel; a first polarizer which is disposed on a first surface of the display panel and comprises a plurality of first regions and a plurality of second regions, the plurality of first regions and the plurality of second regions being alternately distributed in a first direction, wherein a polarization direction of each of the plurality of first regions is perpendicular to a polarization direction of each of the plurality of second regions;

a viewing device for virtual reality for viewing images displayed by the display device, the viewing device, comprising:
a lens;
a third polarizer and a fourth polarizer which are arranged side by side on a second surface of the lens, and
wherein a polarization direction of the third polarizer being perpendicular to a polarization direction of the fourth polarizer;
wherein the polarization direction of each of the plurality of first regions of the first polarizer in the display device is the same as the polarization direction of the third polarizer in the viewing device, and the polarization direction of each of the plurality of second regions of the first polarizer in the display device is the same as the polarization direction of the fourth polarizer in the viewing device, and
wherein the third polarizer and the fourth polarizer are located on a side of the lens distal to the display panel, and are in contact with each other, and
wherein a combination of an orthographic projection of the third polarizer on the second surface and an orthographic projection of the fourth polarizer on the second surface covers the second surface, and
wherein the display device further comprises a second polarizer disposed on a side of the display panel distal to the first polarizer, and the second polarizer comprises a plurality of third regions and a plurality of fourth regions, the plurality of third regions and the plurality of fourth regions being alternately distributed in the first direction; orthographic projections of the plurality of third regions on the display panel overlap with orthographic projections of the plurality of first regions on the display panel respectively, and orthographic projections of the plurality of fourth regions on the display panel overlap with orthographic projections of the plurality of second regions on the display panel respectively; a polarization direction of each of the plurality of third regions is perpendicular to the polarization direction of each of the plurality of first regions, and a polarization direction of each of the plurality of fourth regions is perpendicular to the polarization direction of each of the plurality of second regions.

2. The head-mounted display apparatus according to claim 1, wherein the first surface is a light emitting surface of the display panel.

3. The head-mounted display apparatus according to claim 1, wherein the plurality of first regions and the plurality of second regions are configured as a plurality of strip-shaped regions extending in a second direction, wherein the first direction and the second direction intersect each other.

4. The head-mounted display apparatus according to claim 3, wherein the display panel comprises a plurality of sub-pixels arranged in an array, a row direction of the array is the first direction and a column direction of the array is the second direction, an orthographic projection of each of the plurality of first regions and the plurality of second regions on the display panel covers 1 to 3 columns of the sub-pixels.

5. The head-mounted display apparatus according to claim 4, wherein orthographic projections of the plurality of first regions and the plurality of second regions on the display panel each cover a same number of columns of the sub-pixels.

6. The head-mounted display apparatus according to claim 1, wherein the display panel comprises a first substrate, a second substrate, and a liquid crystal layer between the first substrate and the second substrate.

7. The head-mounted display apparatus according to claim 1, wherein the viewing device does not comprise a liquid crystal layer.

8. The head-mounted display apparatus according to claim 7, wherein the lens is a one-piece Fresnel lens, and the third polarizer and the fourth polarizer are disposed on a flat surface of the Fresnel lens.

9. The head-mounted display apparatus according to claim 1, wherein the lens is a one-piece Fresnel lens, and the third polarizer and the fourth polarizer are disposed on a flat surface of the Fresnel lens.

10. The head-mounted display apparatus according to claim 9, wherein the one-piece Fresnel lens comprises a first sub-Fresnel lens pattern and a second sub-Fresnel lens pattern arranged side by side on a side opposite to the flat surface.

11. The head-mounted display apparatus according to claim 1, wherein there is no gap between the third polarizer and the fourth polarizer.

12. The head-mounted display apparatus according to claim 1, wherein the viewing device only comprises one lens.

* * * * *